United States Patent [19]

Cholet

[11] Patent Number: 5,311,291
[45] Date of Patent: May 10, 1994

[54] MEASURING METHOD AND DEVICE, IN PARTICULAR FOR MEASURING CIGARETTES, USING A LASER BEAM

[75] Inventor: Georges Cholet, Orleans, France

[73] Assignee: Societe Nationale d'Exploitation Industrielle des Tabacs et des Allumettes, France

[21] Appl. No.: 909,473

[22] Filed: Jul. 6, 1992

[30] Foreign Application Priority Data

Jul. 4, 1991 [FR] France .................. 91 08357

[51] Int. Cl.$^5$ ................ G01B 11/08; G01B 11/10
[52] U.S. Cl. ................ 356/386; 356/387; 250/560
[58] Field of Search ............ 356/383–387, 356/381, 372; 250/560

[56] References Cited

U.S. PATENT DOCUMENTS

| | | |
|---|---|---|
| 3,749,500 | 7/1973 | Carlson et al. ............ 356/156 |
| 4,007,992 | 2/1977 | Petrohilos et al. ......... 356/160 |
| 4,129,384 | 12/1978 | Walker et al. ............ 356/383 |
| 4,198,165 | 4/1980 | Kirschstein ............. 356/383 |
| 4,213,707 | 7/1980 | Evans, Jr. .............. 356/387 |
| 4,260,260 | 4/1981 | Letort et al. ............ 356/385 |
| 4,332,475 | 6/1982 | Demarest ............... 356/386 |

FOREIGN PATENT DOCUMENTS

| | | |
|---|---|---|
| 2419508 | 10/1979 | France . |
| 2636731 | 9/1988 | France . |
| 2039034 | 7/1980 | United Kingdom . |
| 2072840 | 10/1981 | United Kingdom . |
| 2021260 | 1/1983 | United Kingdom . |
| 2162941 | 2/1986 | United Kingdom . |

OTHER PUBLICATIONS

Laser Precision Measurement, (J.E.E. Journal Electronic Engineering), vol. 19, (1982), Apr., No. 184, Tokyo, Japan.

Primary Examiner—James C. Housel
Assistant Examiner—Rachel Freed
Attorney, Agent, or Firm—William A. Drucker

[57] ABSTRACT

At least one dimension of the transverse cross-section of an object is measured in a predetermined direction by scanning the cross-section at constant speed with a laser beam which is moved in the plane of the cross-section but remains perpendicular to this direction. Successive pulses are generated representing the times, opto-electronically detected, at which the downstream side beam disappears and reappears. An electronic window is generated from said pulses during each of the time intervals of interception of the beam by the object. Clock pulses are counted during each of the windows and each of the counts obtained is compared with a predetermined digital threshold to validate the respective measurement.

4 Claims, 2 Drawing Sheets

MEASURING METHOD AND DEVICE, IN PARTICULAR FOR MEASURING CIGARETTES, USING A LASER BEAM

BACKGROUND OF THE INVENTION

1. Field of the Invention

The present invention concerns improvements to the measuring methods disclosed in French patents Nos. 2 636 731 and 2 646 904 respectively filed 16 Sep. 1988 and 9 May 1989.

2. Description of the Prior Art

In these methods the transverse cross-section plane of a cylindrical object whose diameter is to be measured is scanned at constant speed by a laser beam which remains parallel to a predetermined direction and the time for which said beam is intercepted by the object is measured.

The application of these methods to measuring the diameter of a cigarette usually requires that the measurement is performed in a plurality of directions in the transverse cross-section, the cigarette being rotated about its axis for this purpose and the mean value of its diameter being calculated.

The second of the aforementioned patents further provides for moving the cigarette in translation parallel to its axis in order to measure its diameter in a plurality of transverse cross-sections to allow for any axial variations due, for example, to the presence of a torn paper fragment projecting from the body of the cigarette.

In theory the presence of any such projection increases the measured diameter.

It has been found that in some cases, in practise in the presence of "fluff" (defects inherent to the structure of the paper in which the tobacco is wrapped), the mean diameter measured in one transverse cross-section is actually less than the real value, by as much as 10%.

An object of the invention is a method which eliminates this drawback and makes it possible to eliminate totally the effects of any kind of foreign bodies or asperities on the surface of a body whose transverse dimension is to be measured.

Another object of the invention is a method of measuring a plurality of dimensions in a common direction on a transverse cross-section having surface discontinuities, for example, internal voids.

SUMMARY OF THE INVENTION

In one aspect, the present invention consists in a method of measuring at least one dimension of the transverse cross-section of an object in a predetermined direction by scanning said cross-section at constant speed with a laser beam which is moved in the plane of said cross-section but remains perpendicular to said direction and measuring at least one time for which said beam is intercepted or allowed to pass by said body by opto-electronic sensing of the presence or the absence of the downstream side beam, in which method successive pulses are generated representing the times at which the downstream side beam disappears and reappears, an electronic window is generated during each of the time intervals separating either the disappearance of the downstream side beam from its reappearance when the application is to measure the dimension of a solid area of the cross-section or the presence of the downstream side beam from its disappearance when the application is to measure the dimension of an empty area, and clock pulses are counted during each of said windows.

In a preferred embodiment the method involves comparing the counts obtained with a predetermined digital threshold to validate the respective measurement.

Adjustment of this threshold according to the transverse dimension of the body to be measured then makes it possible to eliminate the effects of foreign bodies parallel to the surface of the body.

A further object of the invention is to provide a device for implementing the above-defined method.

In a second aspect, the present invention consists in a device for implementing a method of measuring at least one dimension of the transverse cross-section of an object in a predetermined direction by scanning said cross-section at constant speed with a laser beam which is moved in the plane of said cross-section but remains perpendicular to said direction and measuring at least one time for which said beam is intercepted or allowed to pass by said body by opto-electronic sensing of the presence or the absence of the downstream side beam, in which method successive pulses are generated representing the times at which the downstream side beam disappears and reappears, an electronic window is generated during each of the time intervals separating either the disappearance of the downstream side beam from its reappearance when the application is to measure the dimension of a solid area of the cross-section or the presence of the downstream side beam from its disappearance when the application is to measure the dimension of an empty area, and clock pulses are counted during each of said windows, in which method each of the counts obtained is compared with a predetermined digital threshold to validate the respective measurement, said device comprising a laser and a scanning device incorporating an optical system comprising means for increasing the width of the scanning beam in a plane perpendicular to the scanning plane.

This latter arrangement makes it possible to eliminate the effects of foreign bodies perpendicular to the surface of the body to be measured.

Other features and the advantages of the invention will emerge clearly from the following description.

DETAILED DESCRIPTION OF THE INVENTION

Figure 1:
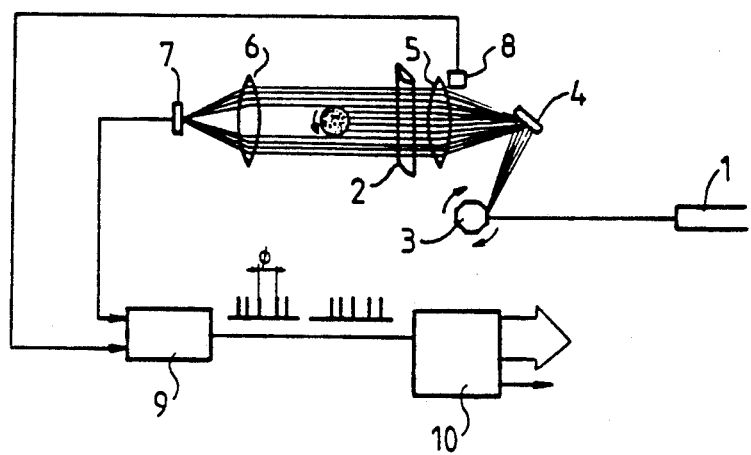
FIG. 1 is a diagrammatic representation of a preferred embodiment of the device in accordance with the invention.

FIG. 1 shows a low-power laser 1 emitting a beam which is reflected by a rotating octagonal mirror 3 on the upstream side of the focus of a lens 2. The resulting rotating beam is successively reflected from a plane mirror 4 inclined at 45° to the axis of an optical system comprising two convergent lenses 5 and 6, rendered parallel to said axis by the lens 5 and concentrated on the axis of the optical system at the focus of the lens 6 where it impinges on a photodetector 7. The lens 2 is a semi-cylindrical lens between the object and the lens 5 and serves to widen the beam.

The mirror 3 is rotated at 3,000 rpm, for example, to displace the beam parallel to the axis of the optical system and in the plane of the figure at a constant speed.

The cigarette to be measured is held by means that are not shown in a position perpendicular to the plane of the beam and rotated about its axis.

The cigarette holding and rotation means are preferably of the type disclosed in the first of the above-mentioned patents, in other words they comprise a rotary tubular support having a cylindrical bore through which the cigarette is passed and orifices in the bore associated with air suction means.

This holds the cigarette against the wall of the bore so that one of its generatrices coincides with a generatrix of the bore over at least one third of the length of the bore.

The device is usually part of a sequence of diverse measuring devices through which the cigarette falls under its own weight. It is vertical and the plane in which the beam is displaced is horizontal. 512 or 1,024 measurements, for example, are made during each revolution of the cigarette, which takes 2.5 s, for example. The mean is calculated.

A phototransistor 8 detects the arrival of the beam in the vicinity of the upper edge of the lens 5 and supplies a synchronization pulse ($I_1$, FIG. 3) at the start of each scan by means of an electronic circuit 9 generating calibrated duration pulses for each signal it receives.

Immediately the beam reaches the active area (the field of the optical system) a second pulse $I_2$ is generated by the circuit 9 which receives a signal from the photodetector 7. Likewise, successive pulses $I_3, I_4, \ldots, I_8$ are generated for each successive disappearance and reappearance of the portion of the beam on the downstream side of the cigarette. A pulse $I_9$ denotes the end of the active area.

Figure 2:
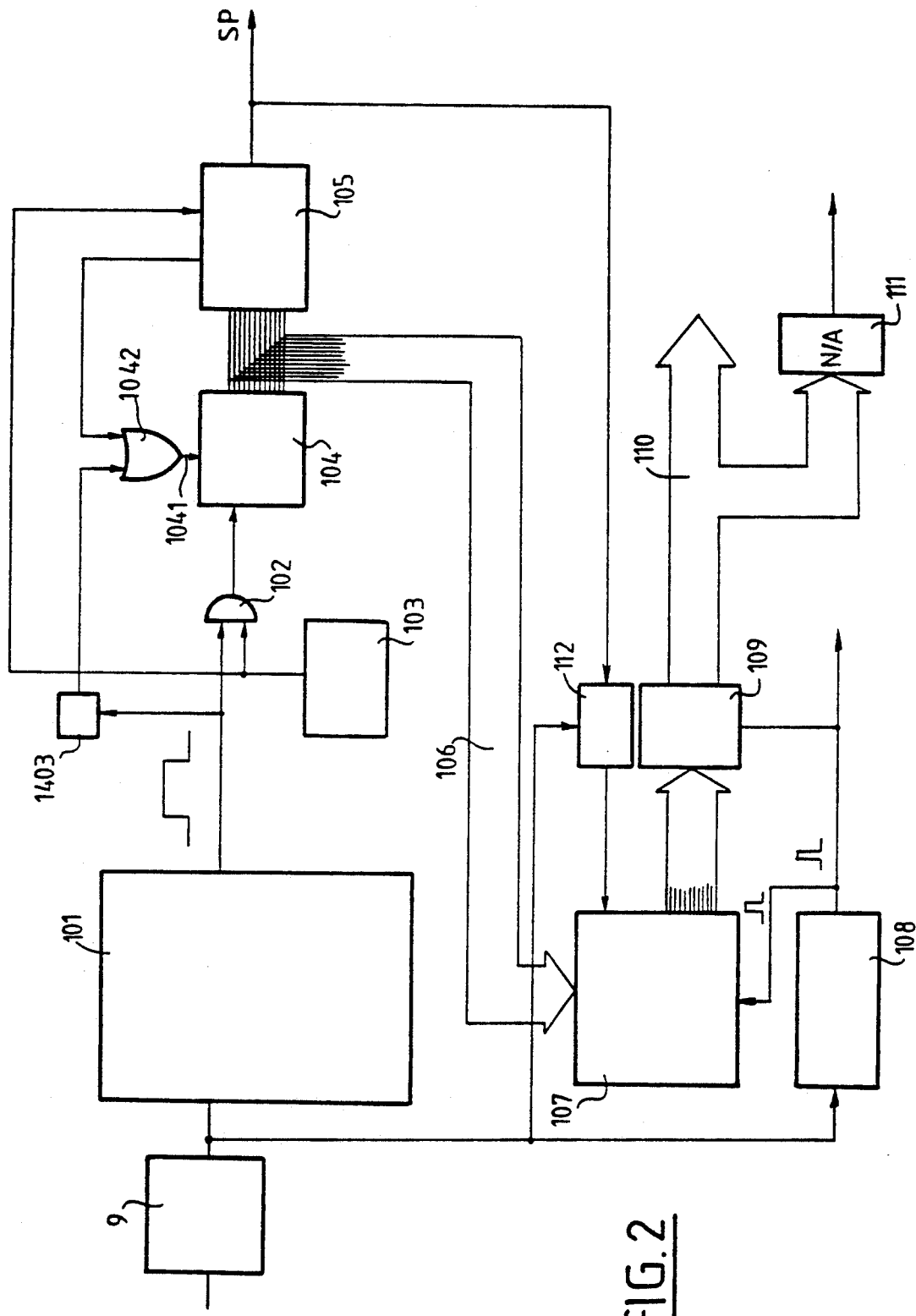
FIG. 2 is a block diagram of an electric signal processor of the device.

The pulses are applied to an electronic circuit 10 which will now be described with reference to FIG. 2.

The output of the pulse generator circuit 9 is connected to an electronic window generator 101 which enables an AND gate 102 which transmits to a counter 104 a signal at a frequency of 24 MHz generated by a clock 103. In the application to measurement of the dimension of solid areas the windows are generated between each odd pulse and the next even pulse.

The counter state is compared with a digital threshold in a comparator 105 and a "cigarette present" signal is passed to the measurement output SP if the counter state is above this threshold.

If not, the comparator sends a reset signal to the counter input 1041 via an OR gate 1042. This gate receives a reset signal at the end of each window from a circuit 1403 sensing the falling edge of the latter.

The count is transferred from the counter via a 12-bit bus 106 to a mean calculator 107 enabled by the signal SP and reset by a pulse applied to its input each time that a counter 108 counting the number of scans (pulses $I_1$ from the circuit 9) reaches a predetermined value (1, 512 or 1,024, for example).

The mean calculated by the device 106 is passed via a set 109 of D-type flip-flops validated at the end of said number of scans, firstly to an output of the bus 110 which indicates the mean diameter as a digital value on 12 bits and secondly to a digital/analog converter 111 which indicates the analog value of the mean diameter.

Figure 3:
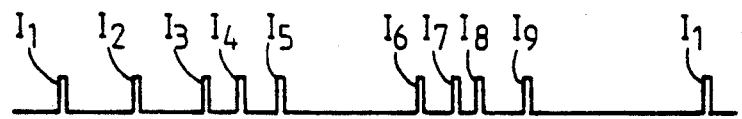
FIG. 3 shows the waveform of said signals when measuring a cigarette incorporating fluff.

The waveform in FIG. 3 represents interception of the beam by an axial (parallel to the cigarette axis) piece of fluff before being intercepted by the latter and then a second, also axial piece of fluff.

The pulses $I_3$, $I_4$ and $I_7$, $I_8$ represent the two spurious interceptions and therefore states of the counter 104 very much below the threshold. The counter is reset at $I_4$ but the device 107 responds to the count representing the interval $I_5$-$I_6$ (interception by the body of the cigarette).

Note that the effect of any foreign body intercepting the beam in the part of the scanning cycle on the downstream side of the cigarette body will be eliminated by the device, even if the intercept duration $I_7$-$I_8$ is above the threshold. Immediately a validation edge SP occurs during the scanning cycle a logic circuit 112 is latched in the "1" state and so prevents any further validation of the device 107 before the start of the next cycle at which said logic circuit is reset by the pulse $I_1$.

The implementation of the various above circuits will be obvious to the man skilled in the art.

Given that two foreign bodies may be very close together, real time measurement requires that the components of the calculator and the logic must switch at frequencies of several tens of MHz, so that high-speed CMOS components must be used.

The dimensional threshold is adjusted, depending on the product to be measured, to the highest possible value compatible with secure operation. This will be 2.56 mm, for example, in the case of cigarettes.

In the relatively rare case where radial fluff (perpendicular to the body of the cigarette) is present there is the risk that, given the thinness of the laser beam, the latter only begins to be masked when it reaches the free end of each piece of fluff which would cause the measurement to indicate the sum of the length of the pieces of fluff and the diameter of the cigarette.

Because the lens 2 widens the cross-section of the beam in a plane perpendicular to the plane of the figure, radial fluff whose cross-section is narrower than the beam in said perpendicular plane is not able to block the beam sufficiently to generate a disappearance pulse and so is ignored.

The principle of a device in accordance with the invention can also be applied to measuring the dimension of an empty space surrounded by solid areas, for example the width of the aperture in a razor blade. This open region is disposed between two solid areas between which it must be correctly centered. The solid areas will be respectively measured using the intervals between the first odd pulse ($I_3$) in the active area and the next pulse ($I_4$) and between the second odd pulse ($I_5$) of the same area and the next pulse ($I_6$). The width of the empty region will be measured using the interval between the first even pulse ($I_4$) in the active area and the next pulse ($I_5$). The device as shown in FIG. 2 would naturally have to be modified to feed to three different counters clock pulses generated during the three contiguous windows $I_3$-$I_4$, $I_4$-$I_5$ and $I_5$-$I_6$. An arrangement of this kind will be obvious to the man skilled in the art.

It goes without saying that various modifications may be made to the embodiment described and shown without departing from the scope of the invention.

There is claimed:

1. Method of measuring at least one dimension of a transverse cross-section of an object in a predetermined direction by scanning said cross-section at constant speed with a laser beam which is moved in a plane of said cross-section but remains directed perpendicular to said direction towards a photodetector, said method comprising the steps of:

generating an electrical pulse each time the laser beam seen from said photodetector disappears and reappears, measuring time intervals between two successive of said electrical pulses corresponding to an interception of the laser beam by the object by counting clock pulses occurring between said two electrical pulses, and comparing each of the counts obtained with a predetermined digital threshold, and validating a measurement when the corresponding count exceeds said digital threshold.

2. Method according to claim 1 wherein said threshold is adjusted so as to validate measurements slightly lower than the dimension to be measured in order to eliminate the effect of comparatively small foreign bodies extending perpendicularly to said scanning plane.

3. Device for measuring at least one dimension of a transverse cross-section of an object in a predetermined direction, comprising:

a laser emitting a scanning laser beam, a scanning device for scanning said cross-section at constant speed with said laser beam which is moved in a plane of said cross-section but remains directed perpendicular to said direction towards a photodetector, said device comprising:

means for generating electrical pulses each time the laser beam seen from said photodetector disappears or reappears, means for generating and counting clock pulses between two successive of said electrical pulses corresponding to an interception of the laser beam by the object, means for comparing each of the counts obtained with a predetermined digital threshold and for validating a measurement when the corresponding count exceeds said threshold, and an optical system comprising means for widening the scanning laser beam in a plane perpendicular to the scanning plane in order to eliminate the effect of comparatively small foreign bodies extending in said scanning plane.

4. Method of measuring at least one dimension of a transverse cross-section of an object in a predetermined direction by scanning said cross-section at constant speed with a laser beam which is moved in a plane of said cross-section but remains directed perpendicular to said direction towards a photodetector, said method comprising a plurality of measurement cycles, each cycle comprising from a starting time the steps of:

generating an electrical pulse each time the laser beam seen from said photodetector disappears and reappears, measuring time intervals between two successive of said electrical pulses corresponding to an interception of the laser beam by the object by counting clock pulses occurring between said two electrical pulses, comparing each of the counts obtained with a predetermined digital threshold and validating a measurement at a validation time when the corresponding count exceeds said digital threshold, and rejecting all count occurring between said validation time and the start time of a next measurement cycle.

* * * * *